United States Patent [19]
Cook et al.

[11] 3,748,919
[45] July 31, 1973

[54] SANITARY CHAIN

[75] Inventors: Charles H. Cook; Dwight H. Bergquist, both of Springfield, Mo.

[73] Assignee: Henningsen Foods, Inc., White Plains, N.Y.

[22] Filed: Jan. 19, 1972

[21] Appl. No.: 219,062

[52] U.S. Cl. .............................. 74/249, 74/250 R
[51] Int. Cl. .............................. F16g 13/02
[58] Field of Search .................... 74/249, 250 R

[56] References Cited
UNITED STATES PATENTS

| 494,110 | 3/1893 | Maxon | 74/249 |
| 2,272,837 | 2/1942 | Getz et al. | 74/250 R |
| 2,547,581 | 4/1951 | Kearns | 74/249 |
| 3,176,831 | 4/1965 | McRobert | 74/249 X |

*Primary Examiner*—Leonard H. Gerin
*Attorney*—Norman N. Holland

[57] ABSTRACT

A drive chain which is particularly useful with food processing or similar machinery where the chain must be periodically cleaned or sanitized. The chain is formed of metal links which are releasably coupled together to form an endless drive chain suitable for sprocket drive. The chain links, including the coupling portions are formed so that the assembled chain has its surface fully exposed for cleaning as, for example, by a water spray.

9 Claims, 8 Drawing Figures

PATENTED JUL 31 1973 3,748,919

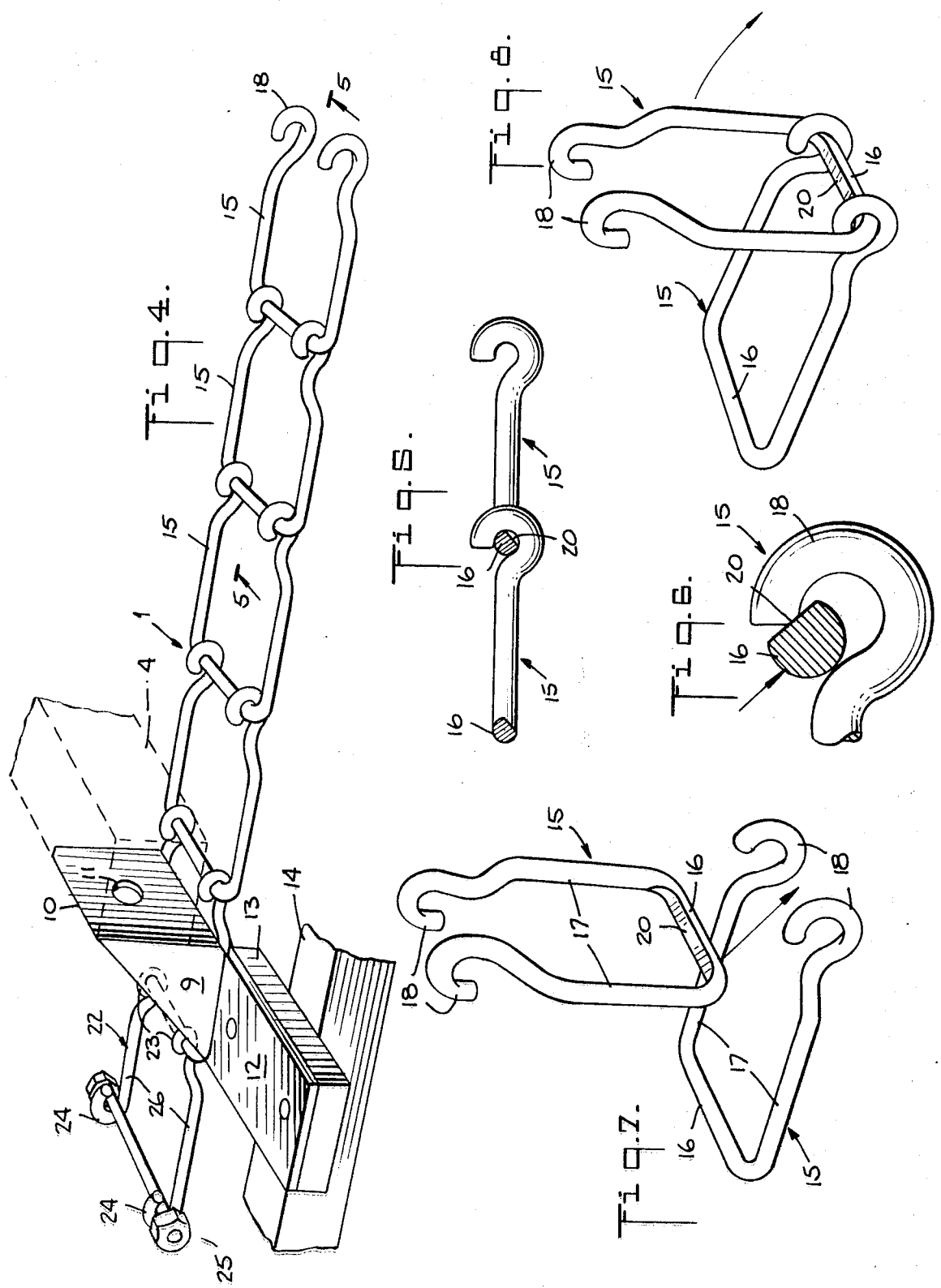

SANITARY CHAIN

BACKGROUND OF THE INVENTION

The present invention relates to a drive chain for machinery and more particularly to an improved drive chain adapted for use with food processing machinery or other machinery which must remain sanitary and which must, therefore, be periodically sanitized or cleaned.

The increasing use of automation in food processing operations has led to the use of increasingly complex and automated food processing machines. Such machines include spaced and cooperating driven elements which are coupled by drive chains. A number of drive chains including conventional roller and sprocket drive elements have been utilized as well as a number of other chain designs. In order to meet government and other sanitary codes, this food processing machinery is periodically taken out of operation and is cleaned or sanitized using sanitizing sprays and other cleaning devices.

A particular problem is encountered in this connection with respect to the drive chains utilized in the equipment. The roller drive chains and other chains, even though formed of stainless steel material, have been difficult to sanitize due to the enclosed or bearing-like arrangements of the connecting joints between adjacent chain links. In roller chains, for example, the conventional design includes relatively long hollow bearings containing closely fitting coupling pins. It is all but impossible to direct a cleansing or sanitizing spray into these areas so that objectionable accumulations form at these chain coupling or bearing points.

Accordingly, an object of the present invention is to provide a drive chain which may be formed from stainless steel or other suitable material and which will be useful in sprocket driven or other drive systems and which will, at the same time, be rapidly and effectively cleaned by a sanitizing spray or bath.

Another object of the present invention is to provide a simplified sanitary chain having detachable links.

Another object of the present invention is to provide a sanitary chain having improved easily cleaned links which are adapted for use with a variety of driven elements.

Another object of the present invention is to provide an improved lightweight sanitary drive chain.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification wherein:

FIG. 4 is a perspective view of a section of a preferred embodiment of the sanitary chain.

FIG. 5 is a sectional view of the sanitary chain of FIG. 4 taken along line 5—5 on FIG. 4.

FIG. 6 is an enlarged detailed view of the coupling portions of two adjacent chain links illustrating them in their coupling position.

FIG. 7 is a perspective view illustrating adjacent chain links positioned for assembly.

FIG. 8 is a perspective view corresponding to FIG. 7 showing the links in their assembled position.

DESCRIPTION OF THE PREFERRED EMBODIMENTS

The sanitary chain, in accordance with the present invention, is used to perform a chain coupling operation as, for example, between spaced drive sprockets. There are a large number of such couplings used in machinery employed in connection with the preparation of or the processing of food products. Machinery which is used in connection with food handling is subjected to rigid sanitary requirements. At frequent intervals during food handling operations, must such machinery is shut down and is completely sanitized and, in some cases, sterilized. Such cleaning operations must be performed both in connection with the various elements of the machinery in contact with food as well as in connection with adjacent and related drive systems, etc. This means that in most cases the drive chains must also be cleaned and sanitized or sterilized. Most such cleaning operations involve the use of liquid sprays or liquid baths where the various elements are sprayed or dipped and may also be simultaneously scrubbed or otherwise cleaned.

Chains in particular have heretofore presented particular problems in the cleaning operations since the couplings between adjacent chain links have included pivotal or hinge-like connections having interconnected bearing and pin members where the relatively close and concealed adjacent surfaces resist the cleansing action of sprays or baths.

The chain of the present invention comprises interconnected links which eliminate such concealed surfaces and which, in addition, provide a strong chain design useful on regular sprockets and which additionally has links which may themselves be readily detached from one another. The following description includes a typical use of such a chain in a spray dryer powder collecting system such as might be used to remove the dried powder from a collecting area in a spray dryer. This is one typical application where the chain is of particular value. There are numerous other applications for this improved chain in food process systems.

Figure 1:
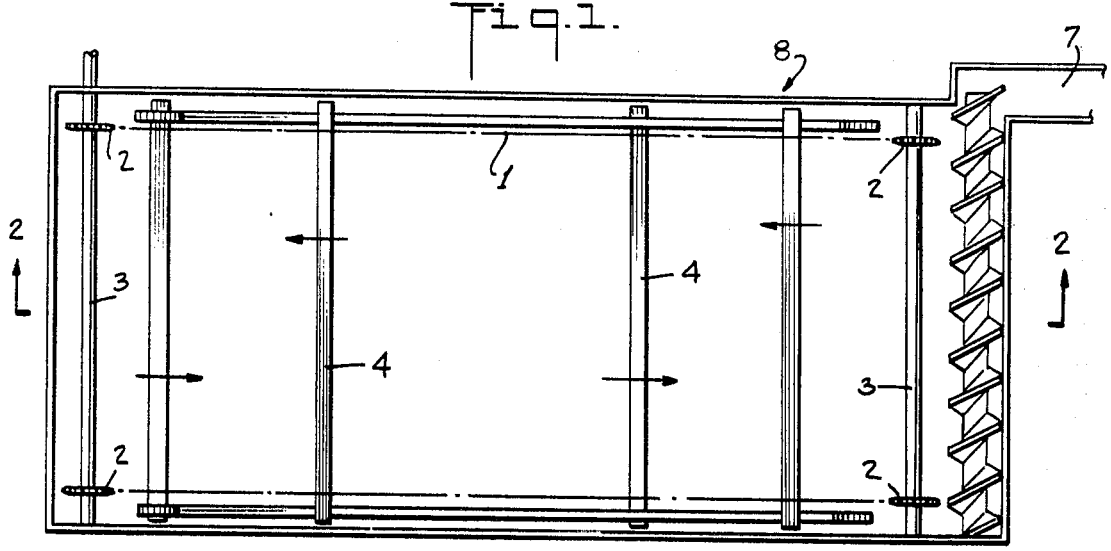
FIG. 1 is a top plan view of a typical use for the improved sanitary chain in a powder conveyor or drag apparatus for a spray drying device.
Figure 2:
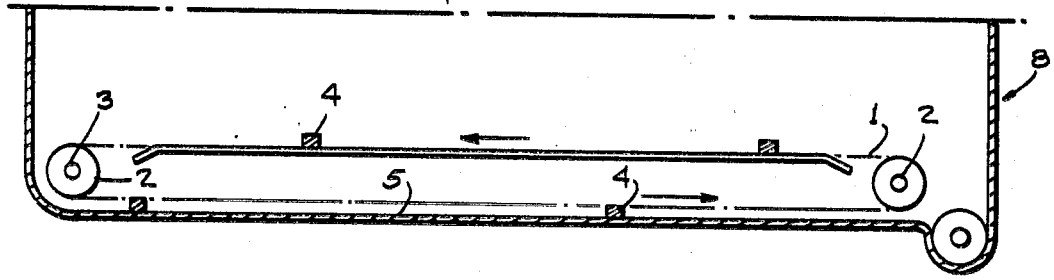
FIG. 2 is a vertical sectional view of the chain installation of FIG. 1 taken along line 2—2 on FIG. 1.
Figure 3:
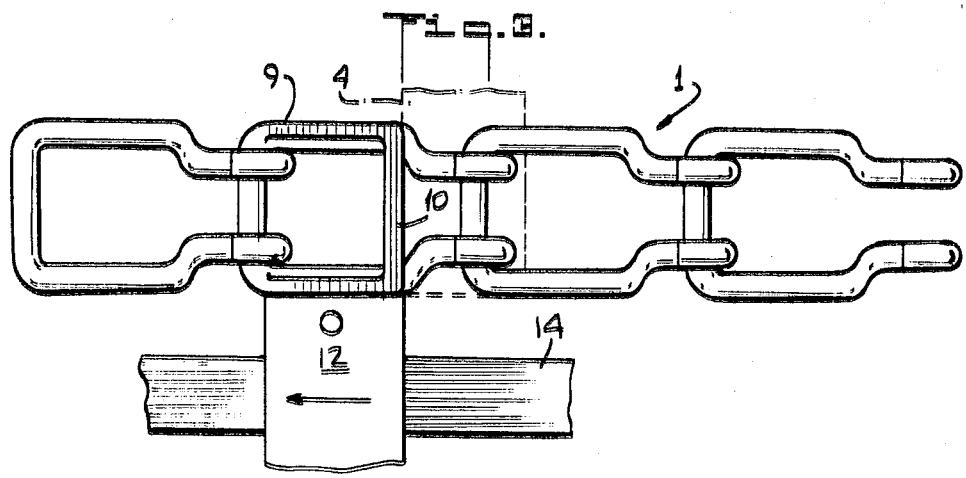
FIG. 3 is an enlarged detailed top plan view of a chain section comprising a number of links.

FIGS. 1 and 2 illustrate two safety chains 1, in accordance with the present invention, running between spaced drive sprockets 2 on spaced shafts 3. One of these shafts 3 is a driven shaft to continually rotate the drive sprockets 2 and the coupling chains 1. The operative element on the drag assembly comprises a number of spaced powder drag flights 4 positioned so that they carry powder along the bottom 5 of the collector area to a spiral conveyor positioned at the outlet 7 of the dryer 8. Each of the drag flights 4 are attached to connector links 9 on the sanitary chain 1 of the form illustrated in FIGS. 3 and 4. These links 9 have a basic link design similar to the remaining regular chain links with mounting brackets 10 welded or otherwise attached to the links 1 surfaces. This bracket 10 includes a mounting hole 11 for the drag flights 4. Additionally, the embodiment of the connector link 9 illustrated in the drawings includes a support flange 12 to which is attached a low friction slide member 13 formed of Teflon or another low friction material. This portion of the link 9 is useful in supporting the chain 1 and for facilitating its movement when the flights 4 are moving along the upper run of the chain 1 in the return direction. These low friction members 13, for example, may be positioned to ride along stationary guide bars 14 positioned just below the path of the upper run of the conveyor chains 1 as illustrated in FIGS. 2 and 4.

The preferred shape of the chain links 15 is illustrated in detail in FIGS. 3 through 8. The links 15 are seen to comprise a transverse coupling section 16 whose opposite ends join parallel longitudinal portions 17. The longitudinal portions 17 each terminate in open hook portions 18 which are shaped to receive the transverse coupling portions 16 of adjacent links 15. The links are preferably formed of metal stock of generally circular cross section such as stainless steel or a steel coated with a material insert to the food and cleansing materials utilized in the process. The links 15 may conveniently be formed by a series of bending operations from straight lengths of metal rods. As best seen in FIG. 5, the hook portions 18 for each link 15 are formed so that their central portion is in the plane of remaining portions of the links so that there is a linear direction for the chain force when the cain 1 is being driven in its assembled position.

It is also seen that the portions of two adjacent links 15 which are in engagement with one another comprise facing rounded surfaces so that the actual contact areas between the hooks 18 of the links 15 and the transverse coupling portions 16 of other links 15 comprise generally linear contact areas which are easily penetrated by and contacted by the washing sprays or baths.

In order to further facilitate washing or sanitizing operations and other handling of the chains 1, the links 15 are seen to be detachable. As illustrated in FIGS. 5 through 8, the means for coupling the links comprises a narrowed or flat portion 20 on the transverse connecting portions 16 of the links 15. This flat portion 20 is positioned on a generally inner portion of the connecting portion 16 so that the adjacent links must be rotated to approximately a 90° relationship (FIGS. 6, 7 and 8) to permit the narrowed section 20 to pass through the open portion of the link hook 18. This arrangement prevents accidental disconnection of adjacent chain links 15 during regular operation and normal handling of the chains 1. The chains 1 may be so oriented on the sprockets 2 so that the angular relationship of adjacent links 15 as they pass around the sprockets 2 curves in a direction opposite to the direction required for detaching adjacent links 15.

At the left-hand end of the section of chain illustrated in FIG. 4, another embodiment of the chain link is illustrated. This is a coupling or master link which is used to attach opposite ends of a chain together when assembling the chain and where there is no adjustment available in the sprocket system. This master link 22 has a hooked end portion 23 for engaging the transverse portion 16 of an adjacent link 15. At its opposite end, its longitudinal side portions 26 are seen to each terminate in an eye 24. A bolt with a threaded nut 25, preferably of the self-locking type, is passed through these eyes 24 and through the end hooks 18 of an adjacent link 15 in assembling the chain. This link is also seen to have a sanitary construction being formed of rounded sections and having only a line contact between adjacent portions.

It will be seen that a new drive chain has been provided which is particularly useful in equipment used in food processing and other operations where the chain itself must be cleaned or sanitized. The improved chain, in accordance with the present invention, is not only easily cleaned but also provides a relatively inexpensive and simple chain useful with regular drive sprockets and which may be disconnected and opened up and otherwise handled in a convenient manner.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus disclosed our invention, we claim:

1. A sanitary drive chain comprising the combination of a plurality of detachable links, said links comprising a plurality of portions of generally circular cross-section comprising a transverse coupling portion, longitudinal portions coupled to opposite ends of said coupling portion, each of said longitudinal sections terminating in an open hook portion, said hook portion being spaced longitudinally inwardly of said longitudinal portion and being proportioned to engage a coupling portion on an adjacent link and said links have detaceing means comprising an irregularly shaped cross-section for said coupling portion.

2. The drive chain as claimed in claim 1 in which said irregularly shaped cross-section is bounded by an arcuate line and a connecting flat line.

3. The chain as claimed in claim 1 in which said coupling portions of the links are detachably connected to the remaining portions.

4. The chain as claimed in claim 3 in which said coupling portions of the links comprise a nut and a bolt.

5. The chain as claimed in claim 1 which further comprises a low friction support member positioned on one or more of said links.

6. The chain as claimed in claim 5 in which said support member comprises a projecting flange having a replaceable low friction coating thereon.

7. In a food processing machine a sanitary drive chain coupling spaced sprockets comprising the combination of a plurality of detachable links, said links comprising a plurality of portions of generally circular cross-section comprising a transverse coupling portion, longitudinal portions coupled to opposite ends of said coupling portion, each of said longitudinal sections terminating in an open hook portion, said hook portion being spaced longitudinally inwardly of said longitudinal portions and being proportioned to engage a coupling portion on an adjacent link, said transverse and longitudinal and hook portions forming a generally rectangular sprocket tooth engaging opening and said links have detaching means comprising an irregularly shaped cross-section for said coupling portion.

8. The chain as claimed in claim 7 which further comprises a plurality of low friction support members positioned on one or more of said links.

9. The chain as claimed in claim 8 in which said support members comprises projecting flanges having replaceable low friction coatings thereon.

* * * * *